Nov. 1, 1932.  L. PAT  1,885,474
AUTOMOBILE BUMPER
Filed July 18, 1931
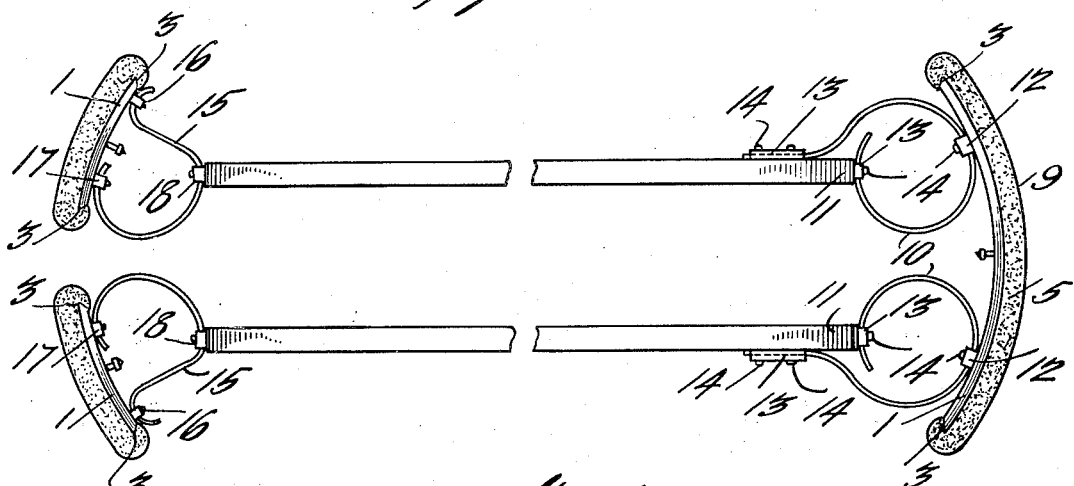
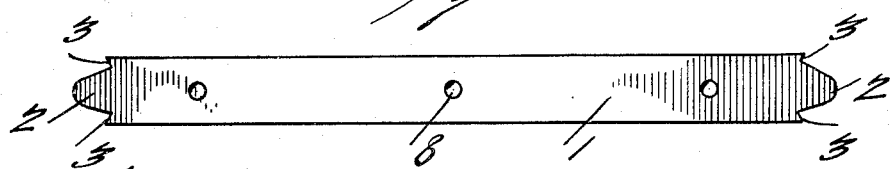
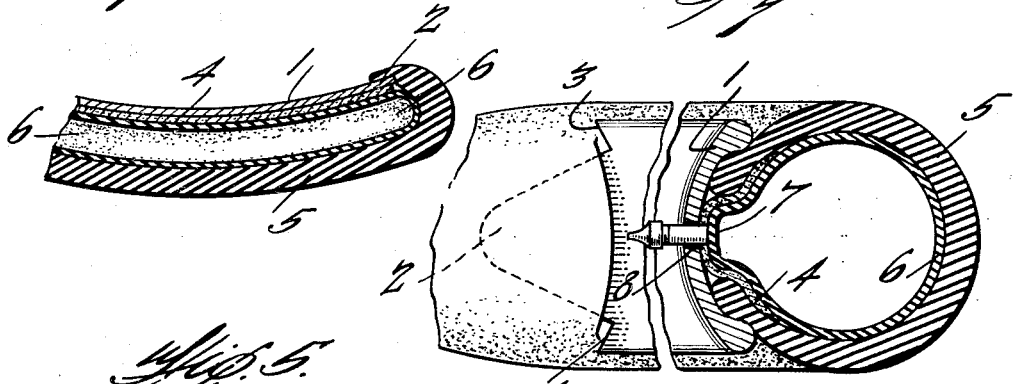
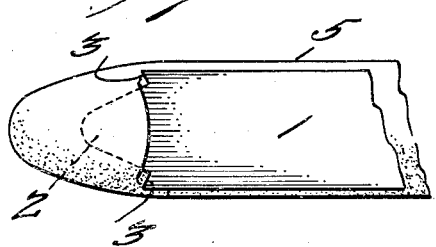
Inventor
LOUIS PAT
By
Attorney Patented Nov. 1, 1932

1,885,474

UNITED STATES PATENT OFFICE

LOUIS PAT, OF CHICAGO, ILLINOIS

AUTOMOBILE BUMPER

Application filed July 18, 1931. Serial No. 551,739.

This invention relates to automobile bumpers in which the impact element is in the form of an air-inflated cushion, with the element readily removable for repair or renewal.

The primary object of the present invention is the provision of a bumper made up of a metallic base, a flexible casing to be removably secured to the base, and an inflatable tube within said casing, the face of the casing being arranged wholly beyond and free of the base to form the impact member.

A further object of the invention is the provision of a spring element by which the bumper may be connected to the vehicle, and provide further impact yielding means for the bumper as a whole.

The invention is illustrated in the accompanying drawing, wherein:—

Fig. 1 is a plan showing front and rear bumpers, constructed in accordance with the invention.

Fig. 2 is an elevation of the base plate.

Fig. 3 is a broken longitudinal section through the bumper.

Fig. 4 is an enlarged transverse section.

Fig. 5 is a detailed elevation, showing the means for connecting the casing to the base plate.

The bumper comprises a metallic strip 1 of concavo-convex form transversely and curved longitudinally in accordance with the curvature required of the particular bumper. This strip is formed at the respective ends to provide a central, longitudinally extending lip 2 and with upper and lower projecting fingers 3, the latter being inwardly and rearwardly offset with respect to the plane of the lip 2. The strip 1 has enlarged upper and lower edges to form projections to receive the bead of the casing 5, which under the inflation of the inner tube is in effect interlocked against separation from the plate by the cooperation of the casing bead and the enlarged edges of the plate 1.

Secured within the concave face, that is, the outer face of the base, is a canvas strip or section 4, and overlying this section is a casing 5 made up of plies of material, as in the ordinary vehicle tire. This casing is open on its inner side, though closed at the ends, so that the terminals of the opening at the inner side of the casing provide for the interconnection of the casing with the base strip, in that the lips 2 at the respective ends of the casing fit within the closed end of the casing, being passed thereinto through the opening at the inner side of the casing adjacent such ends. In this position, the fingers 3 at opposite sides of the lip 2 overlie the edges of the opening in the outer surface of the casing. Thus, the casing is held at its ends by the lip 2 projecting within the casing at the end and the fingers overlying the outer surface of the casing adjacent the ends.

An inner tube 6 is arranged within the casing, this tube, of course, having its ends closed and being of an appropriate length to fit within the particular casing, an ordinary inflating tube 7 opening into the inner tube 6 extending through an opening 8 in the base to provide for inflating the inner tube to the desired extent in the conventional manner.

The front bumper, indicated at 9 in Figure 1, is preferably curved, as shown, though obviously may be straight if desired. A spring strip 10 of sufficient spring resistance is terminally secured to the appropriate fixed portion 11 of the vehicle, passed through a clip 12 on the base plate 1 of the bumper, and carried thence in curved form, with the remaining terminal passed through a clip 13 on the end of the automobile element 11, with the spring strip secured in the clips 12 and 13 by appropriate fastening means, as indicated at 14. The forward bumper is thus secured by substantially circular spring members at two or more appropriate points at the front of the vehicle.

The rear bumpers, which are, of course, arranged on each side of the center of the vehicle, are connected by similar spring strips, though in this instance the spring strips 15 are terminally secured at 16 to spaced brackets or clips on the rear bumper, here indicated at 17. The intermediate portion of the spring strips 15 is secured by appropriate means, indicated at 18, to the adjacent fixture on the automobile, usually the rear end of the frame bar 11.

In connection with the forward bumpers, the impact of which is directly rearwardly, the spring means are in circular form to resist this impact to the maximum. In the case of the rear bumpers, the spring strips have their rounded portion next to the center of the vehicle for the impact under these circumstances is ordinarily at such or near such center line, so that the springs afford a more effective resistance at this point.

The bumper as a whole presents an impact surface made up of an air cushion, with a casing of sufficient strength and character to resist abrading, wear, and protect the inner tube against injury. The casing, of course, is applied to the base by a slight stretching of such casing, and when in place is held against any tendency to displacement, though obviously independently and readily removable when necessary to reach the inner tube for repair or for the replacement of the casing.

The cushion impact of the bumpers provides a most effective means of absorbing the blow and preventing the transmission of that blow to the vehicle. Of course, the inner tube may be inflated to various degrees of resistance, that is, the impact resistance of the bumper may be made a minimum or maximum or any intermediate as may be desired. The bumpers as a whole may be readily removed from the vehicle, and when in applied position will effectively protect the vehicle against impact shocks either from the front or rear.

I claim:—

1. A vehicle bumper comprising a metallic base of concavo-convex shape in cross section and rounded in longitudinal planes, said base terminating in a central, longitudinally projecting ear and in fingers arranged rearwardly of the ear and in planes offset from the ear, a casing open on the inner side and fitting within the concave face of the base, said casing being closed at the ends, with the closed ends engaging over the ear and beneath the fingers to interlock the casing and base, and an inflating tube within the casing.

2. A vehicle bumper comprising a metallic base of concavo-convex shape in cross section and rounded in longitudinal planes, said base terminating in a central, longitudinally projecting ear and in fingers arranged rearwardly of the ear and in planes offset from the ear, a casing open on the inner side and fitting within the concave face of the base, said casing being closed at the ends, with the closed ends engaging over the ear and beneath the fingers to interlock the casing and base, an inflating tube within the casing, and a spring strip terminally secured to a fixed part of the vehicle and centrally secured to the base.

3. A vehicle bumper comprising a metallic base of concavo-convex shape in cross section and rounded in longitudinal planes, said base terminating in a central, longitudinally projecting ear and in fingers arranged rearwardly of the ear and in planes offset from the ear, a casing open on the inner side and fitting within the concave face of the base, said casing being closed at the ends, with the closed ends engaging over the ear and beneath the fingers to interlock the casing and base, an inflating tube within the casing, and a spring strip terminally secured to a fixed part of the vehicle and centrally secured to the base, said strip forming a substantially rounded spring element intermediate the vehicle and base.

4. A metallic bumper comprising a plate of concavo-convex form in cross section and longitudinally curved, the terminals of the plate providing projections and the upper and lower edges of the plate being enlarged, a casing closed at the ends and open at the inner side with bead edges, the casing being fitted to the plate to interlock the bead ends with the enlarged edges of the plate, the inner side of the ends of the casing being formed with pockets to receive the projections at the ends of the plate, and an inflatable tube arranged within the casing.

5. A vehicle bumper including a plate of concavo-convex shape in cross section, the terminals of the plate forming projections, the ends of the plate adjacent the projections providing lips, a casing closed at the ends and having pockets on the inner side at the ends, the casing fitting the concavo-convex plate throughout its length, with the projections of the plate engaging in the pockets of the casing and the lips of the plate bearing against the free edge of the pockets, and an inflatable tube arranged in the casing.

In testimony whereof I affix my signature.

LOUIS PAT.